United States Patent
Cromer et al.

(10) Patent No.: US 6,334,150 B1
(45) Date of Patent: *Dec. 25, 2001

(54) DATA PROCESSING SYSTEM AND METHOD FOR REMOTELY DISABLING A CLIENT COMPUTER SYSTEM

(75) Inventors: Daryl Carvis Cromer, Cary; Brandon Jon Ellison, Raleigh; Eric Richard Kern, Durham; Randall Scott Springfield, Chapel Hill, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/201,062

(22) Filed: Nov. 30, 1998

(51) Int. Cl.[7] .................................................. G06F 15/173
(52) U.S. Cl. ........................ 709/223; 709/224; 710/107; 707/9; 713/201
(58) Field of Search ........................... 713/323, 310, 713/324, 330, 201; 710/104, 8, 107; 709/223, 224; 707/9

(56) References Cited

U.S. PATENT DOCUMENTS

| | | | |
|---|---|---|---|
| 5,983,353 | * 11/1999 | McHann, Jr. | 713/310 |
| 6,122,748 | * 9/2000 | Hobson | 713/323 |
| 6,263,388 | * 11/1998 | Cromer et al. | 710/107 |

* cited by examiner

*Primary Examiner*—Krisna Lim
*Assistant Examiner*—Chuong Ho
(74) *Attorney, Agent, or Firm*—J. Bruce Schelkopf; Bracewell & Patterson, LLP (57) ABSTRACT

A data processing system and method are described for remotely rendering a client computer system inoperable. The client computer system is coupled, to a server computer system utilizing a network. The client computer system is initially powered off. The server computer system transmits a signal to the client computer system utilizing the network to prohibit the client computer system from becoming operable. In response to a receipt of the signal by the client computer system, the client computer system is prohibited from becoming operable. The server computer system remotely renders the client computer system inoperable. Alternatively, the client computer system is capable of receiving wireless signals transmitted by the server computer system. The server computer transmits a wireless signal to the client computer system to prohibit the client computer system from becoming operable. In response to a receipt of the wireless signal by the client computer system, the client computer system is prohibited from becoming operable. The server computer system remotely renders the client computer system inoperable utilizing a wireless signal.

17 Claims, 7 Drawing Sheets

DATA PROCESSING SYSTEM AND METHOD FOR REMOTELY DISABLING A CLIENT COMPUTER SYSTEM

CROSS-REFERENCE TO RELATED APPLICATIONS

The present invention is related to the subject matter of U.S. Pat. 6,266,696 entitled "FULL TIME NETWORK AUXILIARY PROCESSOR FOR A NETWORK CONNECTED PC" issued on Jul. 24, 2001 assigned to the assignee herein named an incorporated herein by reference.

BACKGROUND OF THE INVENTION

1. Field of the Invention

The present invention relates in general to data processing systems and, in particular, to a data processing system and method including a server and client computer system coupled together utilizing a network. Still more particularly, the present invention relates to a data processing system and method including a server and client computer system coupled together utilizing a network for remotely rendering the client computer system inoperable.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC series, Aptiva series, and Thinkpad series.

With PCs being increasingly connected into networks to allow transfers of data among computers to occur, more operations such as maintenance, updating of applications, and data collections are occurring over the network. Computer networks are also becoming essential to their users. It is desirable to minimize loss of productivity by increasing availability of network resources. In today's networked world, the availability and performance of the network is as important as the availability and performance of the personal computer.

Computer systems are typically provided at remote locations, and may be networked to a server. For example, computer systems may be found in public locations such as at banking institutions. Unauthorized use of these remote computer systems is a large problem which can result in lost data and significant costs to businesses.

Therefore a need exists for a data processing system and method for a server computer system to remotely render a client computer system inoperable.

SUMMARY OF THE INVENTION

A data processing system and method are described for remotely rendering a client computer system inoperable. The client computer system is coupled to a server computer system utilizing a network. The client computer system is initially powered off. The server computer system transmits a signal to the client computer system utilizing the network to prohibit the client computer system from becoming operable. In response to a receipt of the signal by the client computer system, the client computer system is prohibited from becoming operable. The server computer system remotely renders the client computer system inoperable.

Alternatively, the client computer system is capable of receiving wireless signals transmitted by the server computer system. The server computer transmits a wireless signal to the client computer system to prohibit the client computer system from becoming operable. In response to a receipt of the wireless signal by the client computer system, the client computer system is prohibited from becoming operable. The server computer system remotely renders the client computer system inoperable utilizing a wireless signal.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–7 of the drawings, like numerals being used for like and corresponding parts of the accompanying drawings.

The present invention is a method and system for permitting a server computer system to prohibit a client computer system from becoming operable where the client is initially powered off. The server and client are coupled together utilizing a network.

The server may prohibit the client from becoming operable either by (1) prohibiting the client from powering up, or (2) resetting a bit which prohibits the client from completing a boot process. The server may prohibit the client from powering up by modifying the operation of power management hardware included within the client. In normal operation, a power supply included within the client generates a stable-power signal, called a POWERGOOD signal, to indicate that the power supply is supplying a stable, full system power. The stable-power signal is required prior to the client powering up even though the power supply is supplying a full system power. The server may prohibit the client from powering up by causing a special purpose processing unit included within the client to generate a POWERGOOD blocking signal. When the POWERGOOD blocking signal is generated, the power management logic will not recognize the POWERGOOD signal. The POWERGOOD signal is overridden, and therefore ignored, when the POWERGOOD blocking signal is generated. Therefore, the client is prohibited from powering up when the POWERGOOD blocking signal is generated.

The server may cause the client to generate a POWERGOOD blocking signal by transmitting a network packet over the network to the client. The network packet will be received by the network hardware which will analyze the contents of the packet. The server may include a signal within the packet to cause the client to generate the POWERGOOD blocking signal.

The server may also render the client inoperable by including a signal within the network packet which causes the resetting of a boot bit within the client. When the boot bit is included within the client, the boot bit is checked during the power on self test (POST) to determine if the bit is set or reset. When the bit is set, normal POST processing will continue, thus, permitting the client to complete its boot process. When the bit is reset, POST processing will stop. Thus, the client will be prohibited from becoming operable because POST will not complete its processing, and no boot will occur.

Figure 1:
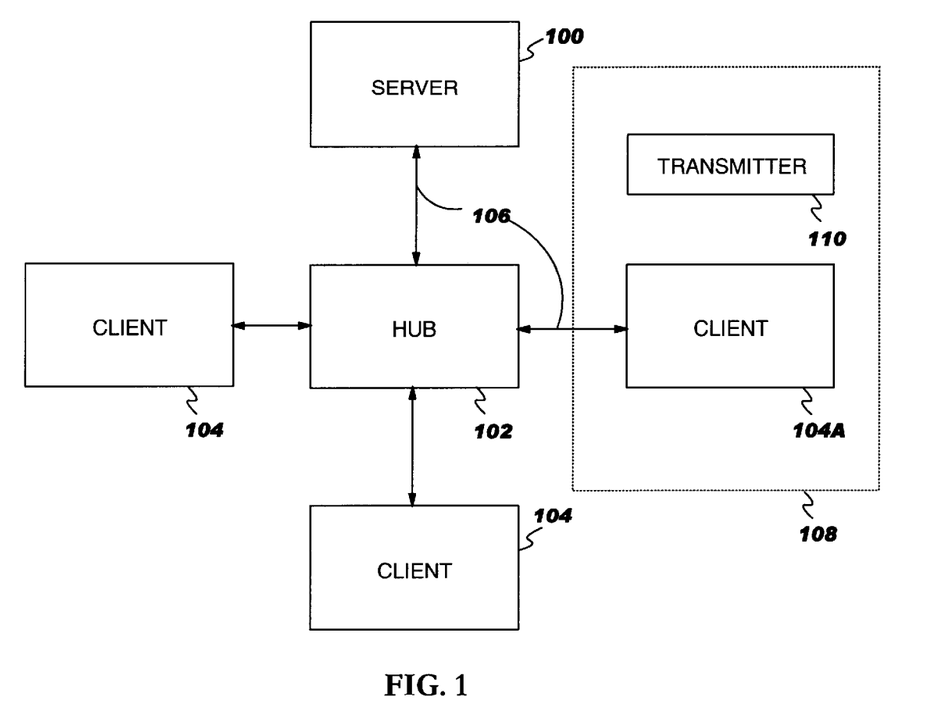
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

A "network" may include any type of data communications channel, such as an Ethernet network, token ring, or X.10 or X.25. Those skilled in the art will recognize that the invention described herein may be implemented utilizing any type of data communications channel. However, the preferred embodiment is implemented utilizing an Ethernet network.

Client 104A may be physically located in a physical region 108 which includes a transmitter 110. Transmitter 110 transmits a wireless, radio frequency (RF) signal to physical region 108 which is received by an antenna included within client 104. In a preferred embodiment, server 100 initiates transmissions by transmitter 110. For example, server 100 utilizes transmitter 110 to transmit signals specified by server 100.

Figure 2:
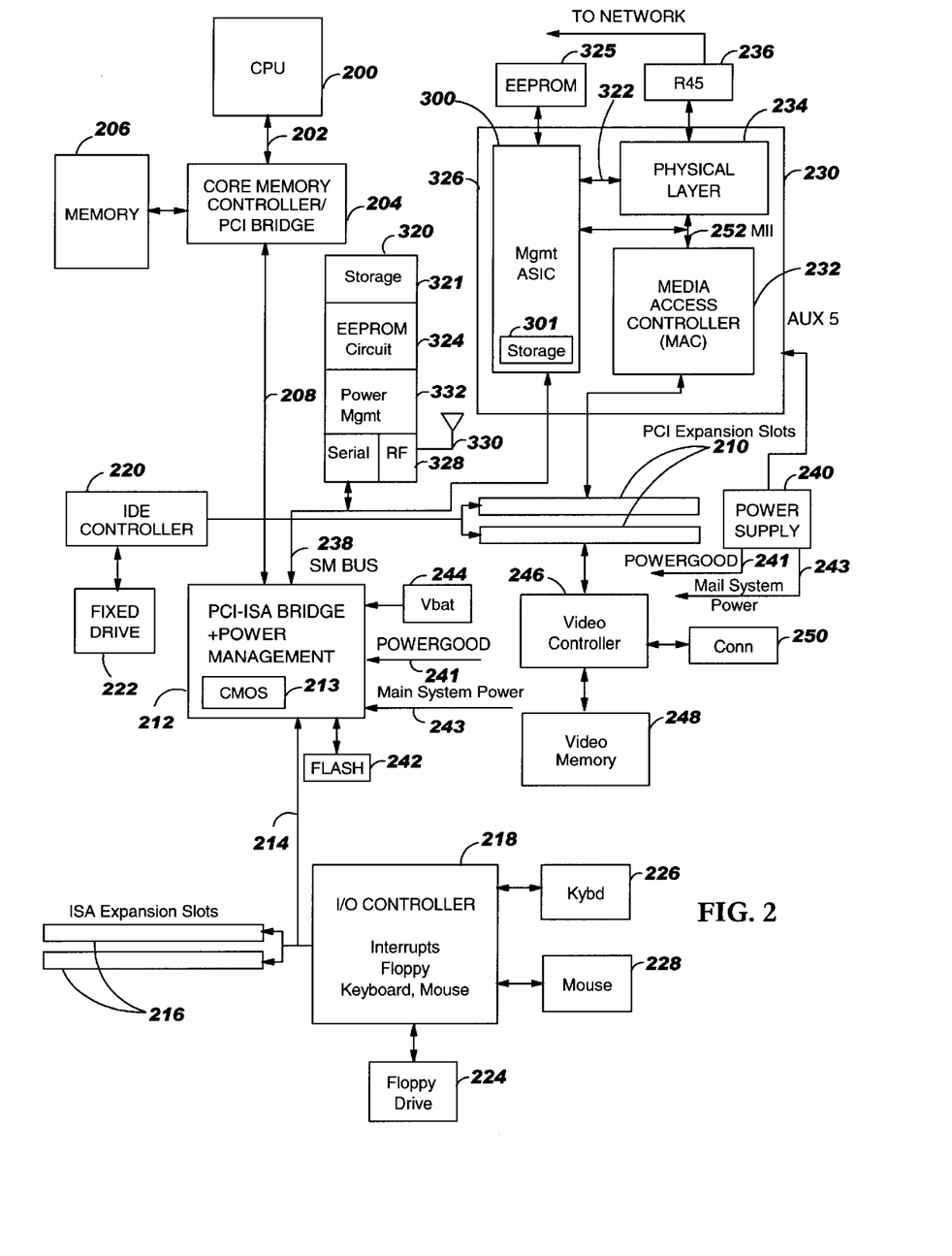
FIG. 2 depicts a pictorial representation of a network adapter included within a client computer system in accordance with the method and system of the present invention.

FIG. 2 illustrates a pictorial representation of a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is also coupled to system memory 206. An integrated drive electronics (IDE) device controller 220 and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

PCI-ISA bridge controller 212 includes an interface for a flash memory 242, which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes CMOS storage 213 that holds initialization settings which represent system configuration data. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a special power supply 240 which supplies full normal system power 243, and has an auxiliary power main AUX 5 which supplies full time auxiliary power to the power management logic 212 and to the network adapter 230. This enables client 104 to respond to a wakeup signal from network adapter 230. In response to a receipt of the wakeup signal, power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a special purpose processing unit 300 coupled to the MII bus 252 between physical layer 234 and MAC 232. Logic module 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Figure 3:
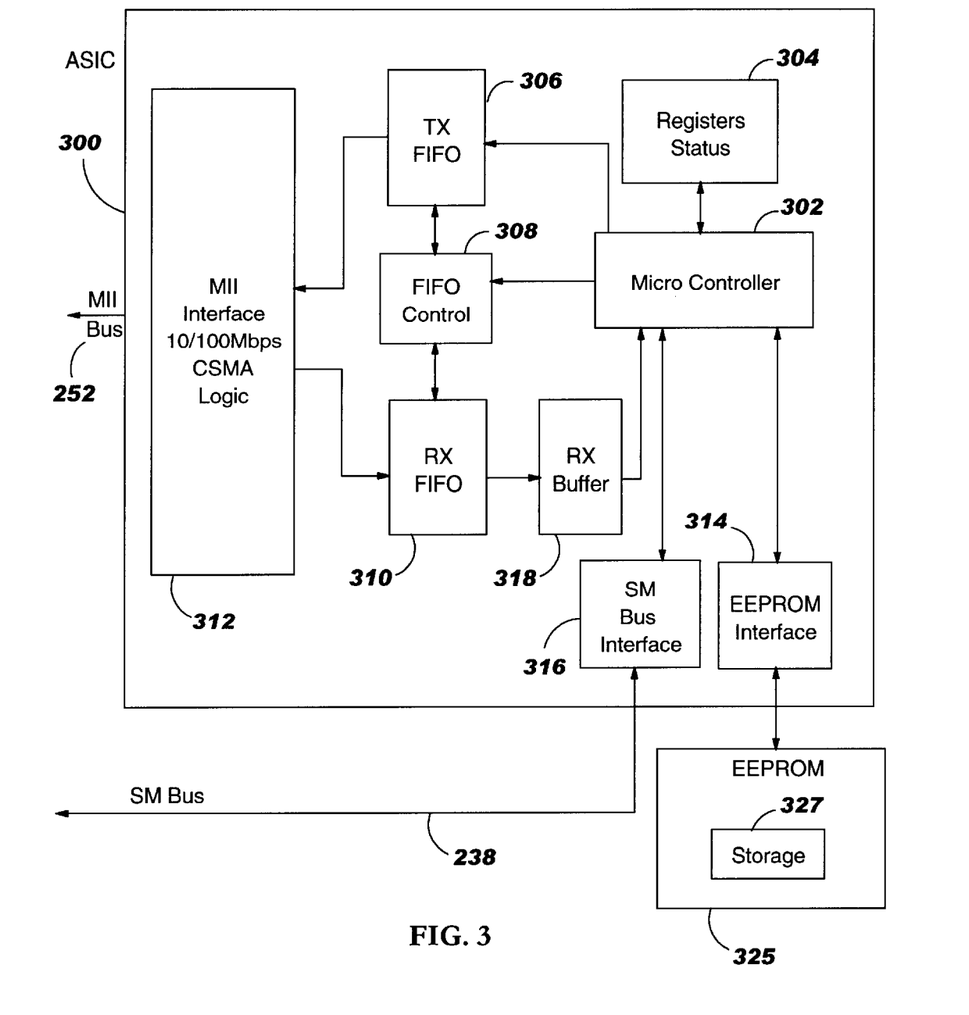
FIG. 3 illustrates a pictorial representation of a special purpose processing unit included within a network adapter included within a client computer system in accordance with the method and system of the present invention.

ASIC 300 also includes storage 301 which may be utilized as described below to store a boot bit which is checked during the power on self test (POST). When a boot bit is utilized, it is stored in storage 301. The boot bit is checked during POST to determine if the bit is set or reset. If the bit is set, POST will continue processing and will complete the boot sequence. If the bit is reset, POST will not continue processing, thus prohibiting the client from booting up.

Data from client computer system 104 is accessed by ASIC 300 over a system management bus (SM) 238. System management bus 238 is a two-wire low speed serial bus used to connect system management devices. This provides a path to allow software running on client 104 to access ASIC and an erasable memory element, EEPROM 325. With the trickle power supplied by signal AUX 5 from power supply 240, ASIC 300 is preferably powered full time.

Power supply 240 outputs a POWERGOOD signal 241 when power supply 240 outputs a stable system power. POWERGOOD signal 241 is received by PCI-ISA bridge and power management 212. Client 104 will not power up until POWERGOOD signal 241 is received by power management 212. Prior to a receipt of POWERGOOD signal 241 by power management 212, client 104 will remain in a powered off state even though power supply 240 may be generating full system power.

ASIC 300 may generate a POWERGOOD blocking signal in order to block power management 212 from receiving the POWERGOOD signal. The POWERGOOD blocking signal may be transmitted to power management 212 utilizing SM bus 238.

FIG. 3 illustrates a pictorial representation of a special purpose processing unit included within network adapter 230 included within a client computer system 104 in accordance with the method and system of the present invention. Special purpose processing unit is implemented utilizing ASIC 300 which includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests from software running on client 104 to access register status 304 or access EEPROM 325. Signals are received from the MII bus 252 by interface unit 312 and passed to RX FIFO 310.

Micro-controller 302 accesses EEPROM 325, which includes storage 327, through EEPROM interface 314 to obtain values to create network packets such as source and destination MAC addresses, IP protocol information, authentication headers, and Universal Data Packet headers. Further, EEPROM 325 retains the Universal Unique Identifier (UUID).

A second erasable memory element, EEPROM 320, is included and is coupled to ASIC 300 utilizing SM bus 238. EEPROM 320 includes storage 321, an EEPROM circuit 324, a digital serial interface 326 for inputting and outputting signals, a radio frequency (RF) interface 328 for receiving wireless signals from an antenna 330, and a power management logic circuit 332.

Figure 4:
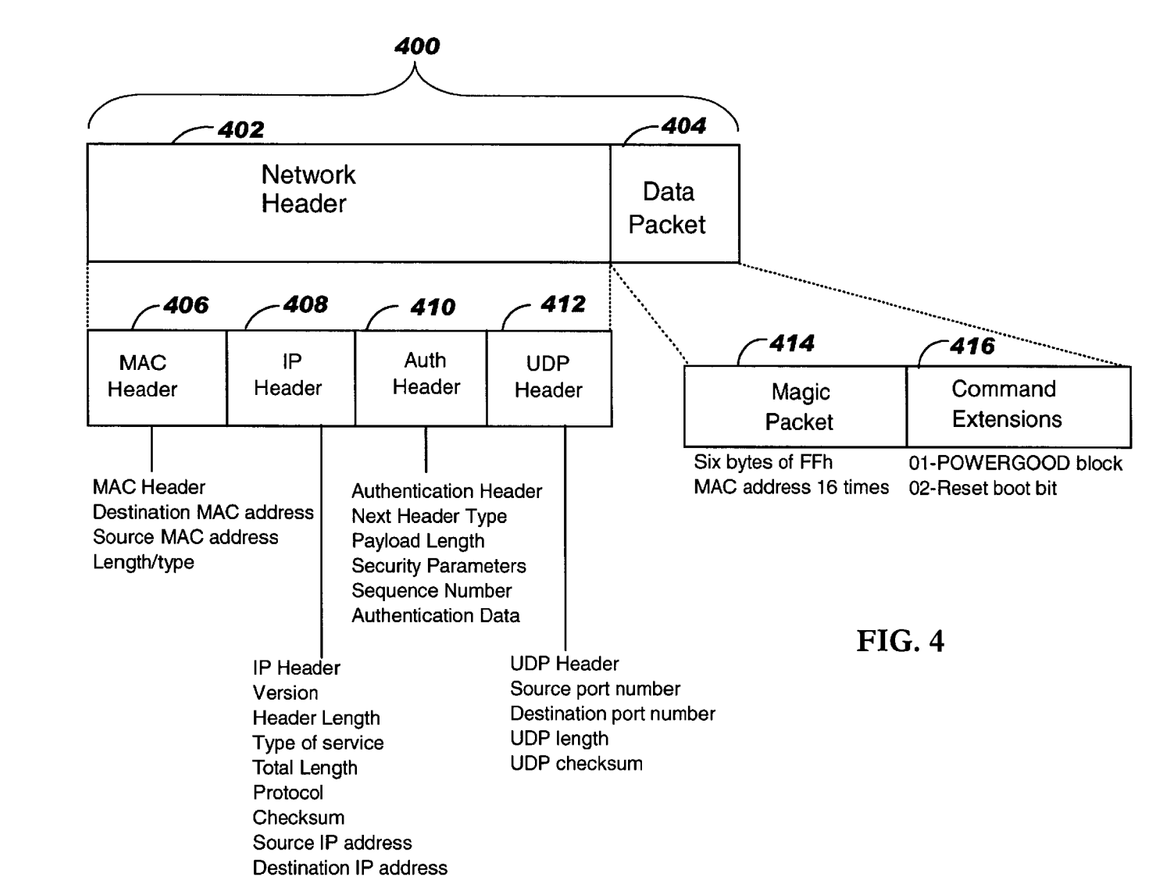
FIG. 4 illustrates a pictorial representation of a network packet, including a network header and a data packet, which may be transmitted by a server computer system over the network in accordance with the method and system of the present invention.

FIG. 4 illustrates a pictorial representation of a network packet 400, including a network header 402 and a data packet 404, which may be transmitted by a server computer system over the network in accordance with the method and system of the present invention. Each network packet 400 includes a network header 402 and a data packet 404.

Network header 402 includes a MAC header 406, IP header 408, authentication header 410, and UDP header 412 which are all known in the art to provide addresses, identifiers, and other information for assuring correct transfer of the packet. Data packet 404 includes the information content to be transferred.

Data packet 404 includes a magic packet 414 and command extensions 416. The content of Magic packet 414 is six bytes of "FF" followed by 12 copies of client MAC addresses. Magic packet 414 is a specialized type of packet. Magic packet 414 is a management packet which does not include standard network data. When magic packet 414 is detected utilizing the six bytes of "FF", MAC 232 will ignore magic packet 414.

Data packet 404 also may include command extensions 416. Server computer system 100 may specify one of a plurality of command extensions in data packet 404 in order to prohibit client 104 from becoming operable.

When a network packet 400 is received by client 104, it is received by physical layer 234 and placed on the MII bus 252. When network packet 400 includes magic packet 414, MAC 232 detects that it includes magic packet 414, and then MAC 232 ignores the network packet 400, including magic packet 414 and any command extensions 416. When magic packet 414 is included, ASIC 300 processes network packet 400, including any command extensions 416.

ASIC 300 also receives network packet 400 utilizing the MII interface 252. Data packet 404 is transferred to RX FIFO 310 and then to RX buffer 318. Micro-controller 302 then inspects data packet 404 and determines whether data packet 404 includes command extensions 416. If command extensions 416 are included, the appropriate function is executed in accordance with the description which follows.

Figure 5:
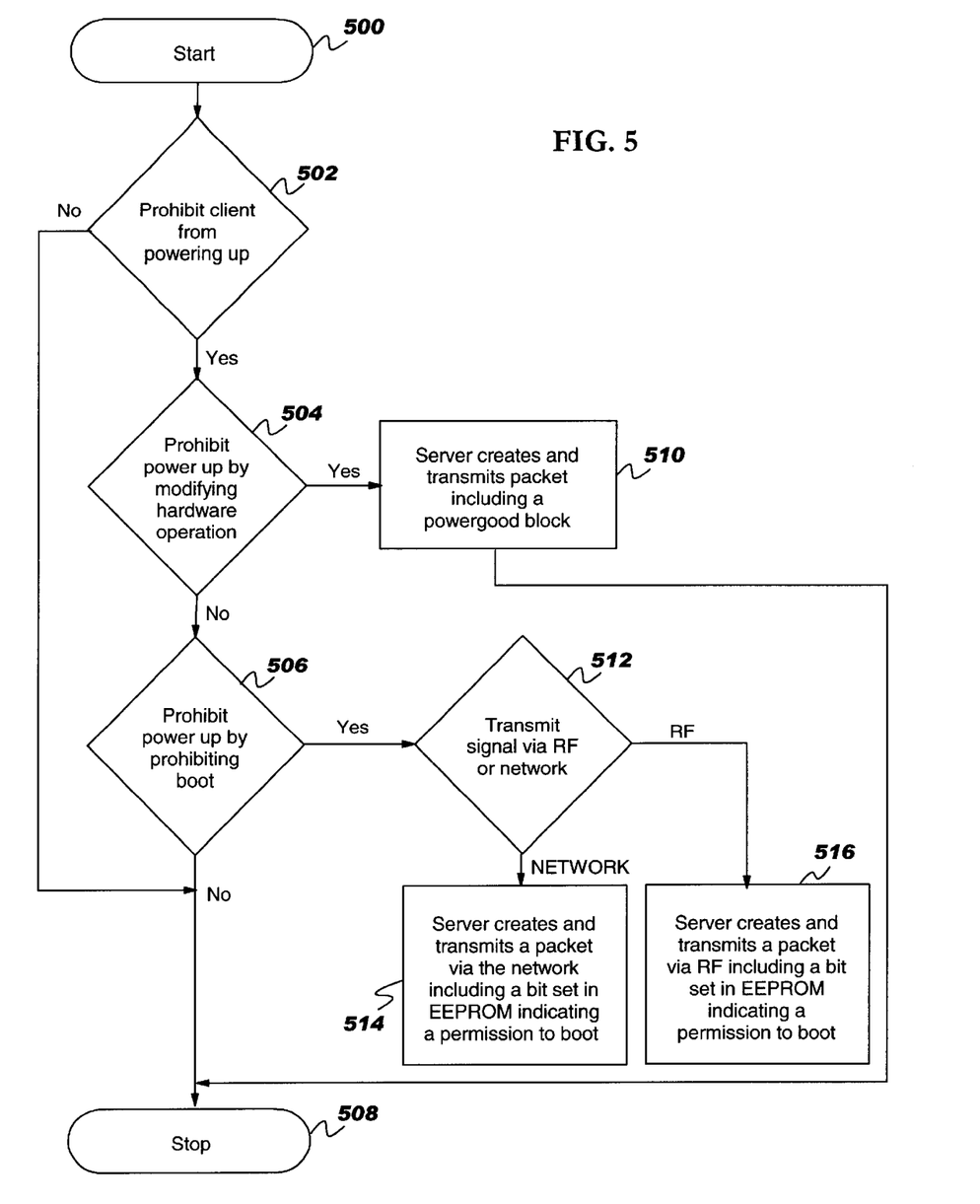
FIG. 5 depicts a high level flow chart which illustrates a server computer system transmitting a signal to a client computer system which causes the client computer system to be rendered inoperable in accordance with the method and system of the present invention.

FIG. 5 depicts a high level flow chart which illustrates a server computer system transmitting a signal to a client computer system which causes the client computer system to be rendered inoperable in accordance with the method and system of the present invention. The process starts as depicted by block 500 and thereafter passes to block 502 which illustrates a determination of whether or not the server is to transmit a signal to a client to prohibit the client from powering up. If a determination is made that the server is not to transmit such a signal, the process terminates as depicted by block 508.

Referring again to block 502, if a determination is made that the server is to transmit a signal to a client to prohibit the client from powering up, the process passes to block 504 which illustrates a determination of whether or not the server is to prohibit a client from powering up by modifying the operation of the client's hardware. If a determination is made that the server is not to prohibit a client from powering up by modifying the operation of the client's hardware, the process passes to block 506 which depicts a determination of whether or not the server is to prohibit a client from powering up by prohibiting the client from booting up. If a determination is made that the server is not to prohibit a client from powering up by prohibiting the client from booting up, the process then terminates as illustrated by block 508.

Referring again to block 504, if a determination is made that the server is to prohibit a client from powering up by modifying the operation of the client's hardware, the process passes to block 510 which depicts the server creating and transmitting a network packet which includes command extensions which specify a POWERGOOD blocking signal. ASIC 300 may transmit a POWERGOOD blocking signal utilizing SM bus 238 to power management 212. When power management 212 receives a POWERGOOD blocking signal, POWERGOOD signal 241 will be blocked. In this manner, power management 212 will not recognize a receipt of POWERGOOD signal 241. Client 104 will be prohibited from powering on. The process then terminates as illustrated by block 508.

Referring again to block 506, if a determination is made that the server is to prohibit a client from powering up by prohibiting the client from booting up, the process passes to block 512 which depicts a determination of whether or not the signal will be a wireless RF signal, or be transmitted utilizing the network. If a determination is made that the signal will be transmitted utilizing the network, the process passes to block 514 which depicts the server creating and transmitting a network packet over the network which includes command extensions which specify the resetting of a boot bit. The boot bit may be included in either the storage of either EEPROM 320 or 325, or in both EEPROM's. The bit is checked by POST during a boot of the client. The bit must be set for POST to complete the boot process. If the bit is reset, POST will not complete the boot process, and the client will not boot. The process then terminates as illustrated by block 508.

Referring again to block 512, if a determination is made that the signal will be a wireless RF signal, the process passes to block 516 which illustrates the server creating and transmitting a wireless signal which includes command extensions which specify the resetting of the boot bit.

Figure 6:
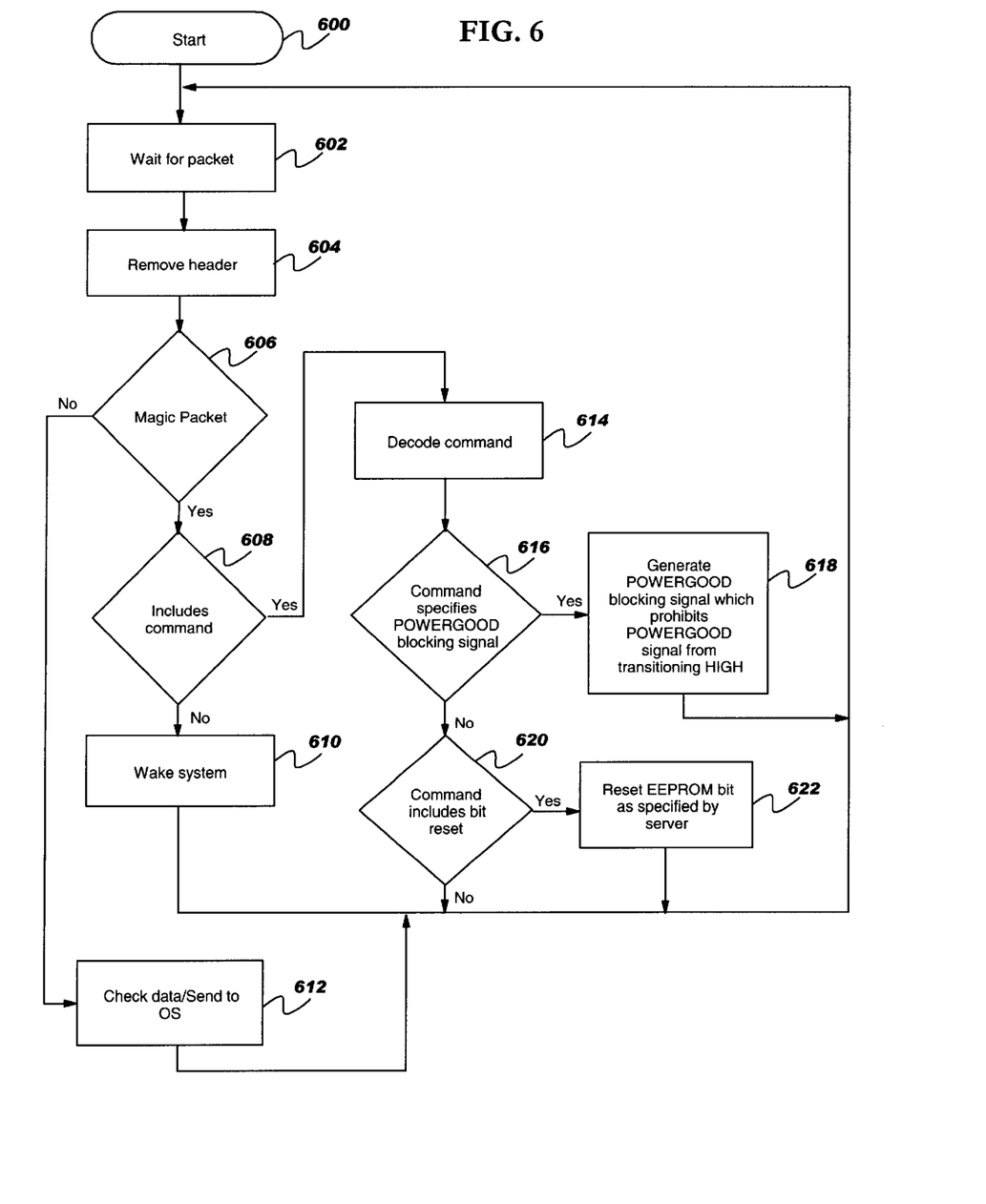
FIG. 6 illustrates a high level flow chart which depicts a client computer system receiving a signal from a server computer system which causes the client computer system to be rendered inoperable in accordance with the present invention.

FIG. 6 illustrates a high level flow chart which depicts a client computer system receiving a signal from a server computer system which causes the client computer system to be rendered inoperable in accordance with the present invention. The process starts as depicted by block 600 and thereafter passes to block 602 which illustrates a micro-controller 302 included within a client computer system waiting to receive network packet 400. When the packet has been received, physical layer 234 places data packet 404 included within network packet 400 on the MII bus 252. The MII bus 252 is read by MII interface 312 of ASIC 300. ASIC 300 transfers data packet 404 from MII interface 312 to RX FIFO 310 and to RX buffer 318.

The process then passes to block 604 which depicts micro-controller 302 removing network header 402 from the packet. Next, block 606 illustrates a determination by micro-controller 302 whether data packet 404 included magic packet 414. If a determination is made that data packet 404 did not include magic packet 414, the process passes to block 612 which depicts the data included within data packet 404 being sent to the operating system (OS). The process then passes back to block 602.

Referring again to block 606, if a determination is made that data packet 404 did include magic packet 414, the process passes to block 608 which illustrates a determination of whether or not data packet 404 also included additional commands 416. If a determination is made that data packet 404 does not include any additional commands 416, the process passes to block 610 which depicts the transmission of a wakeup command which will cause the client to power up. The process then passes back to block 602.

Referring again to block 608, if a determination is made that data packet 404 does include additional commands 416, the process passes to block 614 which depicts the decoding of the additional commands 416. Next, block 616 illustrates a determination of whether or not the command specifies a POWERGOOD blocking signal. If a determination is made that the command specifies a POWERGOOD blocking signal, the process passes to block 618 which depicts ASIC 300 generating a POWERGOOD blocking signal which prohibits the POWERGOOD signal from transitioning HIGH. The POWERGOOD signal must transition HIGH in order for the client to power up. The client will remain inoperative until the POWERGOOD signal transitions HIGH. The process then passes back to block 602.

Referring again to block 616, if a determination is made that the command does not specify a POWERGOOD blocking signal, the process passes to block 618 which depicts a determination of whether or not the command specifies the resetting of a bit in a storage device.

Those skilled in the art will recognize that a boot bit may be stored in either storage 327 of EEPROM 325, storage 321 of EEPROM 320, or any other storage device included within client 104. Those skilled in the art will also recognize that it may be preferable to include two boot bits, one in storage 321 and one in storage 327.

If a determination is made that the command does specify the resetting of a bit in storage 327, the process passes to block 622 which illustrates the resetting of the boot bit. The process then passes back to block 602. Referring again to block 620, if a determination is made that the command does not specify the resetting of a boot bit, the process passes back to block 602.

Figure 7:
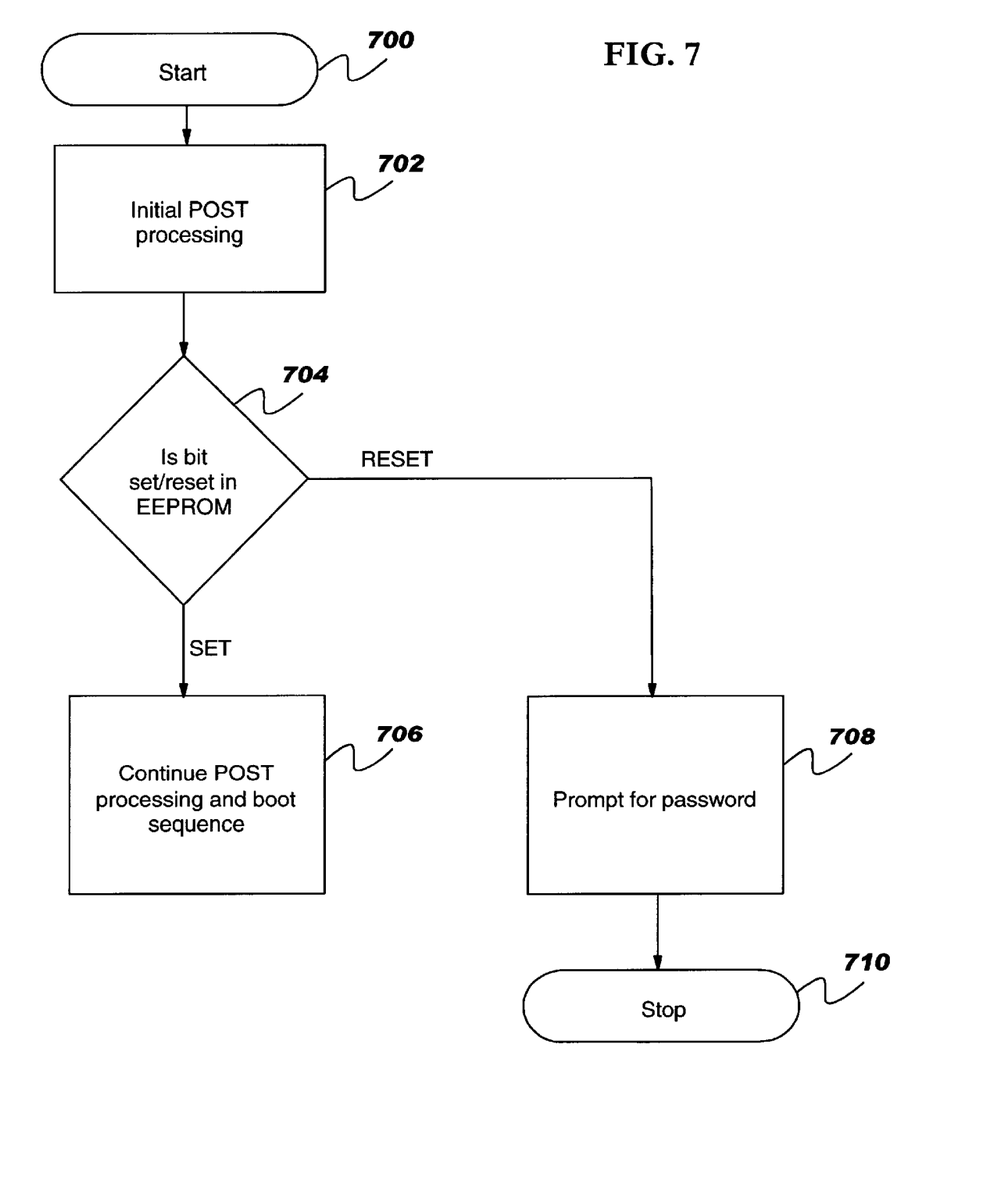
FIG. 7 depicts a high level flow chart which illustrates a client computer system initiating a boot process which includes a checking of a boot bit in accordance with the method and system of the present invention.

FIG. 7 depicts a high level flow chart which illustrates a client computer system initiating a boot process which includes a checking of a boot bit in accordance with the method and system of the present invention. The process starts as depicted by block 700 and thereafter passes to block 702 which illustrates initial POST processing. Next, block 704 depicts a determination of whether or not a boot bit stored in a storage device is set or reset. If the boot bit is set, the process passes to block 706 which illustrates the continuation of POST processing and the boot sequence. Referring again to block 704, if a determination is made that the boot bit is reset, the process passes to block 708 which depicts the prompting for a password. Thereafter, block 710 illustrates the termination of the process. The client computer system will not boot when the boot bit is reset.

The present invention provides a server computer system with the ability to remotely render a client inoperable, either by prohibiting the client from powering on, or by prohibiting the client from booting. Therefore, a network administrator may remotely access a client and render it inoperable without the need to go to the client's physical location. The server may render the client inoperable at any time which is convenient to the network administrator regardless of the physical location or authorized hours for accessing the client.

In addition, the present invention limits the ability of an unauthorized user to access the client. Because the client is rendered inoperable prior to being powered on or booting, it is substantially more difficult for an unauthorized user to access the client.

While a preferred embodiment has been particularly shown and described, it will be understood by those skilled in the art that various changes in form and detail may be made therein without departing from the spirit and scope of the present invention.

What is claimed is:

1. A method in a data processing system for remotely rendering a client computer system inoperable, said client computer system being coupled to a server computer system utilizing a network, said method comprising the steps of:
said client computer system being initially powered off;
said server computer system transmitting a signal to said client computer system utilizing said network to prohibit said client computer system from becoming operable; and
in response to a receipt of said signal by said client computer system, prohibiting said client computer system from becoming operable, wherein said server computer system remotely rendered said client computer system inoperable.

2. The method according to claim 1, further comprising the step of said server computer system remotely rendering said client computer system inoperable by modifying operation of power management hardware included within said client computer system in response to a receipt of said signal.

3. The method according to claim 2, wherein said step of prohibiting said client computer system from becoming operable further comprises the step of prohibiting said client computer system from powering on.

4. The method according to claim 3, wherein said client computer system includes a power supply, and further comprising the steps of:
said power supply generating a stable-power signal in response to a determination by said power supply that said power supply is supplying a stable system power, said stable-power signal being required prior to said client computer system being capable of powering on; and
in response to a receipt of said signal by said client computer system to prohibit said client computer system from becoming operable, prohibiting said power management hardware from receiving said stable-power signal, wherein said client computer system is not capable of being powered on while said power management hardware is prohibited from receiving said stable-power signal.

5. The method according to claim 1, wherein said step of prohibiting said client computer system from becoming operable further comprises the step of prohibiting said client computer system from booting.

6. The method according to claim 5, further comprising the steps of:
establishing a register for storing a boot bit;
permitting said client computer system to boot only when said boot bit is set; and
prohibiting said client computer system from booting when said boot bit is reset.

7. The method according to claim 6, wherein said step of said server computer system transmitting a signal to said client computer system utilizing said network to prohibit said client computer system from becoming operable further comprises the step of said server computer system transmitting a signal to said client computer system utilizing said network to reset said boot bit.

8. The method according to claim 7, further comprising the step of in response to a receipt of said signal by said client computer system, resetting said boot bit, wherein said client computer system is not capable of booting.

9. A data processing system for remotely rendering a client computer system inoperable, said client computer system being coupled to a server computer system utilizing a network, comprising:
said client computer system being initially powered off;
said server computer system executing code for transmitting a signal to said client computer system utilizing said network to prohibit said client computer system from becoming operable;
in response to a receipt of said signal by said client computer system, said client computer system being prohibited from becoming operable, wherein said server computer system remotely rendered said client computer system inoperable.

10. The system according to claim 9, further comprising said server computer system executing code for remotely rendering said client computer system inoperable by modifying operation of power management hardware included within said client computer system in response to a receipt of said signal.

11. The system according to claim 10, further comprising said client computer system being prohibited from becoming operable by prohibiting said client computer system from powering on.

12. The system according to claim 11, said client computer system further including a power supply, and further comprising:

said power supply capable of generating a stable-power signal in response to a determination by said power supply that said power supply is supplying a stable system power, said stable-power signal being required prior to said client computer system being capable of powering on; and said power management hardware being prohibited from receiving said stable-power signal in response to a receipt of said signal by said client computer system to prohibit said client computer system from becoming operable, wherein said client computer system not being capable of being powered on while said power management hardware is prohibited from receiving said stable-power signal.

13. The system according to claim 9, further comprising said client computer system being prohibited from becoming operable by prohibiting said client computer system from booting.

14. The system according to claim 13, further comprising:

a register established within said client computer system for storing a boot bit;

said client computer system being permitted to boot only when said boot bit is set; and said client computer system being prohibited from booting when said boot bit is reset.

15. The system according to claim 14, further comprising said server computer system executing code for transmitting a signal to said client computer system utilizing said network to prohibit said client computer system from becoming operable by transmitting a signal to said client computer system utilizing said network to reset said boot bit.

16. The system according to claim 15, further comprising said client computer system executing code for resetting said boot bit in response to a receipt of said signal by said client computer system, wherein said client computer system is not capable of booting.

17. A data processing system, comprising:

a client computer system being powered-off and including a power supply and power management hardware, said power management hardware generating a stable-power signal in response to said power supply supplying a stable system power, said stable-power signal being required prior to said client computer system capable of being powered-on;

a network adapter included within said client computer system including a network controller and a special purpose processing unit coupled to said network controller, said network controller capable of receiving and transmitting network packets utilizing said network to and from said server computer system;

a server computer system capable of transmitting a network packet including magic packet and a command to said client computer system to prohibit said client computer system from powering on; and said client computer system capable of receiving said network and in response to said receipt, said special purpose processing unit capable of generating a blocking signal which prohibits said power management hardware from receiving said stable-power signal.

* * * * *